United States Patent [19]

Promel

[11] Patent Number: 6,136,924
[45] Date of Patent: *Oct. 24, 2000

[54] PROCESS FOR THE PREPARATION OF A COMPOSITION CONTAINING ETHYLENE POLYMERS, AND USE THEREOF

[75] Inventor: Michel Promel, Brussels, Belgium

[73] Assignee: Solvay (Societe Anonyme), Brussels, Belgium

[*] Notice: This patent issued on a continued prosecution application filed under 37 CFR 1.53(d), and is subject to the twenty year patent term provisions of 35 U.S.C. 154(a)(2).

[21] Appl. No.: 08/571,684

[22] Filed: Dec. 13, 1995

Related U.S. Application Data

[63] Continuation of application No. 08/167,153, Dec. 16, 1993, abandoned.

[30] Foreign Application Priority Data

Dec. 21, 1992 [DE] Germany ............................ 092 01 117

[51] Int. Cl.$^7$ ...................................................... C08F 23/06
[52] U.S. Cl. ............................ 525/242; 525/53; 525/324; 525/232; 525/236; 525/315; 525/319; 525/240
[58] Field of Search ................................ 525/53, 247, 324, 525/232, 236, 315, 319, 240, 242

[56] References Cited

U.S. PATENT DOCUMENTS

| | | | |
|---|---|---|---|
| 4,547,551 | 10/1985 | Bailey et al. ............................ | 525/240 |
| 4,859,749 | 8/1989 | Franke ..................................... | 526/124 |
| 5,047,468 | 9/1991 | Lee et al. .................................. | 525/53 |
| 5,284,613 | 2/1994 | Ali et al. .................................. | 264/566 |

FOREIGN PATENT DOCUMENTS

| | | |
|---|---|---|
| 0022376B1 | 1/1981 | European Pat. Off. . |
| 0057352A2 | 8/1982 | European Pat. Off. . |
| 0398350A2 | 11/1990 | European Pat. Off. . |
| 0528523A1 | 2/1993 | European Pat. Off. . |

*Primary Examiner*—David W. Wu
*Assistant Examiner*—Ling-Siu Choi
*Attorney, Agent, or Firm*—Venable

[57] ABSTRACT

Process for the preparation of a composition containing ethylene polymers comprising a polymer of melt index $MI_2$ of 5 to 1000 g/10 min and a polymer of melt index $MI_5$ of 0.01 to 2 g/10 min, the ratio of these indices being from 500 to 50,000 and the weight ratio of the two polymers being equal to (30 to 70):(70 to 30), according to which part of the ethylene, a catalyst derived from a transition metal having an intrinsic molecular weight distribution defined by an intrinsic $M_w/M_n$ ratio less than or equal to 10 and a deactivation constant less than or equal to 0.5 $h^{-1}$, and a cocatalyst are introduced into a first reactor, polymerization of the ethylene is carried out therein, a mixture comprising one of the polymers, the catalyst and the cocatalyst is drawn off from this reactor and the mixture and another part of the ethylene are introduced into a second reactor, which ethylene is polymerized to form the other polymer.

14 Claims, No Drawings

PROCESS FOR THE PREPARATION OF A COMPOSITION CONTAINING ETHYLENE POLYMERS, AND USE THEREOF

This application is a continuation, of application Ser. No. 08/167,153, Filed Dec. 16, 1993 now abandoned.

The subject of the present invention is a process for the preparation of a composition containing ethylene polymers, using a number of reactors arranged in series. It relates, in particular, to a process for the preparation of a composition containing ethylene polymers additionally comprising an alpha-olefin.

A process for the preparation of a composition containing ethylene polymers is described in Patent EP-22,376-B1 (Mitsui Petrochemical Industries), according to which at least two reactors are used in series, a first part of the ethylene is polymerized in the presence of a catalyst in a first reactor of the series, a polymer and the catalyst are drawn off from this reactor, these are made to move successively into the other reactors into each of which another part of the ethylene is delivered, which ethylene is polymerized, and a composition containing ethylene polymers is recovered from the last reactor. This known process uses, in each reactor, polymerization conditions different from those used in the other reactors, so that, in each reactor, a polymer is produced which has a different viscosity—and consequently a different melt index—from those produced in the other reactors. In particular, the composition containing ethylene polymers obtained by this known process comprises a first polymer having an intrinsic viscosity of 0.3 to 3 and a second polymer having an intrinsic viscosity of 1 to 12, the ratio between these viscosities being at least equal to 1.5.

This known process does not make it possible to achieve a large difference in the viscosities or the melt indices of the polymers produced in the various reactors, so that it does not make it possible to obtain polymers combining good use properties (characteristic of polymers with high melt indices) and good mechanical properties (characteristic of polymers with low melt indices).

Moreover, this known process is ill-suited to adjusting the molecular weight distribution of the final composition. Consequently, it does not allow access to a final composition suited to the implementation of objects by injection (composition having a molecular weight distribution characterized by an $M_w/M_n$ ratio less than 10) nor to compositions which can be used for the manufacture of films by calendering (compositions in which the abovementioned $M_w/M_n$ ratio is greater than 40).

This known process additionally has the disadvantage of causing, when the polymer of low viscosity or of high melt index is manufactured in one of the reactors in a hydrocarbon diluent in the presence of hydrogen, rapid saturation of the diluent with hydrogen.

The present invention solves the disadvantages stated above by providing a novel process using a number of reactors which makes it possible to obtain a pronounced difference in the melt indices of the polymers obtained in the various reactors, which shows great flexibility in adjusting the molecular weight distribution of the final polymer composition and which additionally makes it possible to produce a polymer of very high melt index in the presence of a hydrocarbon diluent and hydrogen, without risk of premature saturation of the diluent by the hydrogen.

Consequently, the invention relates to a process for the preparation of a composition containing ethylene polymers comprising a polymer of high melt index and a polymer of low melt index in at least two reactors, according to which part of the ethylene, a catalyst derived from a transition metal chosen from the elements of groups IIIB, IVB, VB and VIB of the periodic table and a cocatalyst are introduced into a first reactor, polymerization of the ethylene is carried out therein, a mixture comprising one of these polymers, the catalyst and the cocatalyst is drawn off from this reactor, the mixture and another part of the ethylene are introduced into a subsequent reactor, which ethylene is polymerized to form the other polymer, the weight ratio of the polymers being equal to (30 to 70):(70 to 30); according to the invention, the catalyst has an intrinsic weight distribution defined by an intrinsic $M_w/M_n$ ratio less than or equal to 10 and a deactivation constant less than or equal to 0.5 h$^{-1}$, and the polymer of high melt index has a melt index MI$_2$, measured under a load of 2.16 kg at 190° C., of 5 to 1000 g/10 min and the polymer of low melt index has a melt index MI$_5$, measured under a load of 5 kg at 190° C., of 0.01 to 2 g/10 min, the ratio between these melt indices being from 500 to 50,000.

Intrinsic molecular weight distribution of a catalyst is understood to denote the molecular weight distribution of a polymer obtained in a single polymerization stage and under constant polymerization conditions in the presence of this catalyst. The intrinsic $M_w/M_n$ ratio which characterizes this intrinsic molecular weight distribution denotes the ratio between the weight-average molecular mass ($M_w$) of the polymer thus obtained and the number-average molecular mass ($M_n$) of this polymer, this ratio being measured by steric exclusion chromatography carried out in 1,2,4-trichlorobenzene at 135° C. on a type 150° C. chromatograph from the company Waters.

Deactivation constant of a catalyst is understood to denote the angular coefficient which characterizes the linear relationship between the logarithm of the ratio of the polymerization rate and of the initial polymerization rate, and the polymerization time, the polymerization being carried out in the presence of this catalyst. The angular coefficient is calculated using linear regression.

The melt index MI$_2$ (respectively MI$_5$) of a polymer denotes the flow rate of the molten polymer at 190° C., which flows through a die with a diameter of 2 mm and a length of 8 mm, under the effect of a piston ballasted with a mass of 2.16 kg (respectively 5 kg), this flow rate being expressed in g/10 min according to ASTM standard D 1238.

In the process according to the invention, ethylene is polymerized in the presence of a catalyst. An essential characteristic of the process lies in the properties of the catalyst used. According to the invention, the catalyst has an intrinsic molecular weight distribution defined by an intrinsic $M_w/M_n$ ratio at most equal to 10, preferably less than 8, the values less than or equal to 7 being the most advantageous, for example approximately 6.5 or 5. The intrinsic $M_w/M_n$ ratio is usually greater than 3, the values greater than 4 being the most common. The catalyst used in the process according to the invention additionally has a deactivation constant less than or equal to 0.5 h$^{-1}$, preferably at most equal to 0.3 h$^{-1}$, the values less than or equal to 0.2 h$^{-1}$, for example of approximately 0.15 h$^{-1}$, being recommended. The deactivation constant is generally greater than 0.05 h$^{-1}$, the values greater than or equal to 0.1 h$^{-1}$ being the most common.

The catalyst used in the process according to the invention can be chosen from the Ziegler-type catalysts, in particular those derived from titanium, and from metallocene-type catalysts, metallocene being a cyclopentadienyl derivative of a transition metal, in particular of zirconium.

There may be mentioned, as non-limiting examples of Ziegler-type catalysts, the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Mention may be made, as examples of metallocene-type catalysts, of metallocenes activated by an aluminoxane and ionic metallocenes activated by an ionizing agent as described, for example, in Patent Application EP-500,944-A1 (Mitsui Toatsu Chemicals).

Ziegler-type catalysts are preferred. Among these, those comprising at least one transition metal chosen from groups IIIB, IVB, VB and VIB, magnesium and at least one halogen are very well suited. Good results are obtained with those comprising:

from 10 to 30% by weight of transition metal, preferably from 15 to 20% by weight, typically approximately 17% by weight, from 20 to 60% by weight of halogen, the values from 30 to 50% by weight (for example, approximately 40% by weight) being preferred, from 0.5 to 20% by weight of magnesium, usually from 1 to 10% by weight, for example approximately 5% by weight, from 0.1 to 10% by weight of aluminium, generally from 0.5 to 5% by weight, the values from 1 to 3% by weight being the most common;

the balance generally consists of elements arising from the products used for their manufacture, such as carbon, hydrogen and oxygen. The transition metal and the halogen are preferably titanium and chlorine.

In the process according to the invention, the polymerization is carried out in the presence of a cocatalyst. It is possible to use any cocatalyst known in the art, especially compounds comprising at least one aluminium—carbon chemical bond, such as optionally halogenated organoaluminium compounds, which can comprise oxygen or an element from group I of the periodic table, and aluminoxanes. Mention may be made, as examples of organoaluminium compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. Organoaluminium compounds, especially those which are not halogenated, are well suited. Triethylaluminium and triisobutylaluminium are especially advantageous.

In the process according to the invention, a plant is used comprising at least two polymerization reactors arranged in series and connected to each other. Each reactor is supplied with ethylene. The catalyst and the cocatalyst are introduced solely into the first reactor, in which ethylene is polymerized until a polymer is obtained which has the characteristics specific to the polymerization conditions of this reactor. A mixture arising from the first reactor and comprising the polymer obtained in the latter, the catalyst and the cocatalyst is introduced, preferably continuously, into the second reactor. Ethylene, which is introduced into this second reactor, is polymerized therein using the catalyst and cocatalyst arising from the first reactor and polymerization conditions (temperature, concentration of transfer agent, concentration of optional comonomer) are used in this second reactor which are different from those used in the first reactor. Thus, the polymer produced in the second reactor has a melt index different from that produced in the first, and the overall polymer composition collected from the second reactor combines characteristics specific to the operating conditions of the first reactor and characteristics specific to the operating conditions of the second reactor.

In the process according to the invention, the polymer of high melt index and the polymer of low melt index can be prepared in any order.

The plant can obviously comprise more than two reactors connected in series. In this case, the first reactor of the series is supplied with the catalyst and the cocatalyst, and each reactor is supplied with ethylene and with the mixture arising from the preceding reactor of the series, this mixture comprising the catalyst, the cocatalyst and a mixture of the polymers produced in the preceding reactors of the series.

In the case where the plant comprises more than two reactors in series, the polymer of high melt index and the polymer of low melt index as defined above can be produced in two adjacent or non-adjacent reactors in the series. In this specific case of the use of the process according to the invention, it is possible to produce, in the other reactors of the series, operating conditions under which there is produced either a polymer of melt index $MI_2$ less than 5, from 5 to 1000 or greater than 1000 or a melt index $MI_5$ less than 0.01, from 0.01 to 2 or greater than 2, the melt indices $MI_2$ and $MI_5$ having been defined above.

The reaction is preferably limited to two reactors.

In a first embodiment of the process according to the invention, the formation of the polymer of high melt index precedes that of the polymer of low melt index. This embodiment proves to be particularly advantageous when it is desired to obtain a composition containing ethylene polymers which can be used for the manufacture of shaped objects whose surface is free of imperfections such as hard points.

In a second embodiment of the process according to the invention, at least one of the reactors is supplied with hydrogen which acts as transfer agent modulating the melt index of the polymer produced in this reactor. The hydrogen partial pressure in the reactor(s) is advantageously from 0.001 to 2 MPa, more particularly from 0.002 to 1.5 MPa, preferably from 0.005 to 1.3 MPa, the ratio between the hydrogen and ethylene partial pressures generally not exceeding 5, preferably not exceeding 3 and being, for example, between 0.01 and 2.5.

In a variant of this second embodiment, hydrogen is introduced continuously into all the reactors, the ratio between the ethylene and hydrogen partial pressures in the first reactor being different from that used in the other reactors. In this variant, it is important to keep these ratios constant in each reactor throughout the duration of the polymerization. The quotient of these two ratios is advantageously greater than 20, preferably than 40; it is desirable that it does not exceed 300, for example 200. A quotient selected from 45 to 175 is particularly well suited.

This embodiment of the process according to the invention has the advantageous distinctive characteristic of making it possible to obtain a polymer with a very high melt index in the presence of a hydrocarbon diluent while avoiding rapid saturation of the hydrocarbon diluent by the hydrogen.

In the process according to the invention, the polymerization procedure in the reactors can be selected from the solution, suspension or gas-phase processes, irrespective of the properties of the polymer which it is desired to prepare therein and of the choice of the process used in the other reactor. For example, it is possible to carry out the polymerization in two gas-phase reactors, or in a first reactor in suspension and in a second reactor in the gas phase or in reverse order. The polymerization is preferably carried out in suspension in two reactors.

In the case of a suspension polymerization, the latter is generally carried out in a hydrocarbon diluent which is inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Preferred diluents are linear alkanes such as n-butane, n-hexane and n-heptane, or branched alkanes such as isobutane, isopentane, isooctane and 2,2,-dimethylpropane, or cycloalkanes such as cyclopentane and cyclohexane or their mixtures. The polymerization temperature is generally chosen from 20 to 200° C., preferably from 50 to 100° C. The ethylene partial pressure is most often chosen from 0.1 to 5 MPa, preferably from 0.2 to 2 MPa, more particularly from 0.4 to 1.5 MPa.

In the process according to the invention, it is optionally possible to supply the second reactor and/or, if appropriate, at least one of the following reactors with fresh catalyst and/or cocatalyst. However, it is preferable to introduce the catalyst and the cocatalyst exclusively into the first reactor.

In a specific embodiment of the process according to the invention, an alpha-olefin is additionally introduced into at least one of the reactors so as to manufacture, in this reactor, a copolymer of ethylene and of this alpha-olefin. The alpha-olefin can be selected from olefinically unsaturated monomers comprising from 3 to 8 carbon atoms, for example propylene, 1-butene, 1-pentene, 3-methyl-1-butene, 1-hexene, 3- and 4-methyl-1-pentenes and 1-octene. Other examples of alpha-olefins are diolefins comprising from 4 to 18 carbon atoms, preferably non-conjugated aliphatic diolefins such as 4-vinylcyclohexene and 1,5-hexadiene, alicyclic diolefins having an endocyclic bridge such as dicyclopentadiene or methylene- and ethylidenenorbornene, and conjugated aliphatic diolefins such as 1,3-butadiene, isoprene and 1,3-pentadiene. Preferred alpha-olefins are propylene, 1-butene, 1-hexene, 1-octene and 1,5-hexadiene. Good results are obtained with 1-butene and 1-hexene.

In this specific embodiment of the process according to the invention, the alpha-olefin is generally introduced into that reactor in which the polymer of low melt index is produced, in an amount adjusted so that this polymer comprises from 0.5 to 20% by weight of alpha-olefin, preferably from 1 to 10% by weight, for example 2% by weight. As an alternative, part of the alpha-olefin can also be introduced into the other reactor, in a restricted amount so that the alpha-olefin content of the polymer of high melt index does not exceed 5% by weight, preferably 3% by weight, for example 1% by weight; the alpha-olefin content of the polymer of high melt index is usually at least equal to 0.1%.

The process according to the invention applies to the preparation of compositions containing ethylene polymers which can comprise one or a number of ethylene homopolymers and/or one or a number of ethylene copolymers.

The process according to the invention makes it possible to obtain compositions containing polymers of ethylene, and optionally of alpha-olefins, in which each individual polymer has a melt index sufficiently different from that of the other or of each of the other polymers, in order to benefit simultaneously from properties favourable to use characteristic of a polymer of high melt index and good mechanical properties characteristic of a polymer of low melt index.

The process according to the invention, moreover, has great flexibility in adjusting the molecular weight distribution in the final composition. Thus, the process according to the invention makes it possible to manufacture a wide range of compositions containing ethylene polymers ranging from those suited to the use of injection-moulded objects to those which can be used for the manufacture of films by extrusion or calendering.

Additionally, the process according to the invention makes it possible to obtain compositions containing polymers of ethylene and optionally of alpha-olefins comprising an alpha-olefin in a variable amount which can reach 10% by weight, preferably from 0.5 to 6% by weight, for example approximately 1% by weight.

The process according to the invention proves to be particularly outstanding for the manufacture of compositions containing polymers of ethylene and optionally of alpha-olefins which can be used for the manufacture of objects having a high resistance to cracking under stress and whose surface is free of imperfections such as hard points.

The invention consequently also relates to compositions containing ethylene polymers having the properties stated above, these compositions comprising, on the one hand, a first polymer having a melt index $MI_2$ of 5 to 1000 g/10 min, preferably from 10 to 500 g/10 min, and, on the other hand, a second polymer having a melt index $MI_5$ of 0.01 to 2 g/10 min, preferably from 0.03 to 1 g/10 min, in particular from 0.05 to 0.7 g/10 min, the ratio of these melt indices being from 500 to 50,000, preferably from 1000 to 10,000. The weight ratio of these two polymers is generally equal to (30 to 70):(70 to 30), preferably to (40 to 60):(60 to 40), for example to (42 to 58):(58 to 42). The first abovementioned polymer can optionally comprise an alpha-olefin in an amount at most equal to 5% by weight and the second polymer comprises from 0.5 to 20% by weight of an alpha-olefin. Advantageous compositions comprise an ethylene homopolymer of high melt index and an ethylene copolymer of low melt index containing, for example, from 0.5 to 6% by weight of an alpha-olefin. The compositions according to the invention have a molecular weight distribution defined by an $M_w/M_n$ ratio which can vary from 5 to 70, in particular from 7 to 50, for example from 10 to 40. Additionally, the compositions according to the invention have a melt index $MI_5$ of 0.1 to 10 g/10 min, in particular from 0.5 to 5 g/10 min, and a dynamic viscosity $\eta$, expressed in dPa.s and measured at a rate gradient of 100 s$^{-1}$ at 190° C., corresponding to the relationship $$0.652 \geq \frac{[\log(177470/MI_5) - \log\eta]}{2 - \log(2.53 \times MI_5)}.$$

The compositions according to the invention commonly contain from 0.5 to 10% by weight of an alpha-olefin, preferably from 1 to 6% by weight.

The compositions according to the invention find a particularly advantageous use in a wide range of industrial applications, from the fact that they combine good use properties and good mechanical properties such as impact resistance and resistance to cracking under stress. The compositions according to the invention are suitable for being used by any conventional process for converting plastics and more particularly by extrusion, blown extrusion, thermoforming-extrusion, calendering and injection processes. These compositions are suitable for the manufacture of shaped objects such as films, sheets, panels, containers, bags and sachets; they are particularly well suited to the manufacture of pipes.

The present invention consequently also relates to the use of the compositions described above for the manufacture of pipes.

The examples whose description follows are used to illustrate the invention.

The meaning of the symbols used in these examples, the units expressing the quantities mentioned and the methods for measuring these quantities are explained below.

$MI_2$=melt index of a polymer denoting the flow rate of the molten polymer at 190° C., which flows through a die with a diameter of 2 mm and a length of 8 mm, under the effect of a piston ballasted with a mass of 2.16 kg, this flow rate being expressed in g/10 min, according to ASTM standard D 1238.

$MI_5$=melt index of a polymer (or of a polymer composition) denoting the flow rate of the molten polymer (or of the molten composition) at 190° C., which flows through a die with a diameter of 2 mm and a length of 8 mm, under the effect of a piston ballasted with a mass of 5 kg, this flow rate being expressed in g/10 min, according to ASTM standard D 1238.

$M_w/M_n$=ratio between the weight-average molecular mass ($M_w$) of a polymer (or of a polymer composition) and the number-average molecular mass ($M_n$) of this polymer (or of this composition), measured by steric exclusion chromatography carried out in 1,2,4-trichlorobenzene at 135° C. on a type 150° C. chromatograph from the company Waters.

$\eta$=dynamic viscosity of a polymer (or of a polymer composition) expressed in dPa.s and measured at a rate gradient of 100 s$^{-1}$ at 190° C.

$K_d$=deactivation constant of a catalyst expressed in h$^{-1}$, which is the angular coefficient which characterizes the linear relationship between the logarithm of the ratio of the polymerization rate and of the initial polymerization rate, and the polymerization time, the polymerization being carried out in the presence of this catalyst. The angular coefficient is calculated using linear regression.

$\alpha$=catalytic activity in grams of insoluble polymer obtained per hour and per gram of catalyst and divided by the molar fraction of ethylene in the diluent.

EXAMPLE 1

In Accordance With the Invention

A. Preparation of the Catalyst

Magnesium diethoxide is reacted with titanium tetrabutoxide for 4 hours at 150° C. in amounts such that the molar ratio of titanium to magnesium is equal to 2. The reaction product thus obtained was then chlorinated and precipitated by bringing the latter into contact with an ethylaluminium dichloride solution for 90 minutes at 45° C. The solid thus obtained, collected from the suspension, comprised (% by weight):

Ti: 17
Cl: 41
Al: 2
Mg: 5.

B. Polymerization of Ethylene in a Single Reactor 1 liter of hexane and 1 mmol of triethylaluminium were introduced into a 1.5 liter autoclave, equipped with a stirrer. The temperature was then raised to 85° C., which was maintained constant throughout the polymerization time. A single charge of hydrogen at a pressure of 0.4 MPa and ethylene were then introduced therein. 7 mg of the solid catalyst obtained in A were then injected therein. The ethylene partial pressure was kept constant at a value of 1 MPa for 1 hour. The autoclave was then degassed and cooled. The polyethylene collected from the autoclave had an $M_w/M_n$ ratio of 6.7 and the catalyst had a $K_d$ of 0.15.

C. Polymerization of Ethylene in Two Reactors

The polymerization process in two successive reactors was simulated in a single reactor in two stages separated by intermediate pressure release and reinitialization of the operating parameters.

Polymerization of a First Polymer (i)

2 liters of hexane and 2 mmol of triethylaluminium were introduced into a 5 liter autoclave, equipped with a stirrer. The temperature was then raised to 85° C., which was kept constant throughout the polymerization time. A single charge of hydrogen at a pressure of 1.3 MPa and ethylene were then introduced therein. The ethylene partial pressure was kept constant at a value of 0.6 MPa. 22 mg of the solid catalyst obtained in A were then injected therein. After 73 minutes, the autoclave was degassed. 200 g of polymer (i) were obtained. The catalyst had an activity $\alpha$ of 10.3.

Polymerization of Second Polymer (ii)

200 ml of hexane were readded to the autoclave. The temperature was brought to 75° C. and kept constant throughout the polymerization time. A hydrogen charge at a pressure of 0.08 MPa, ethylene and a butene charge were then introduced so as to obtain a butene/ethylene molar ratio in the liquid phase of 0.38. The ethylene partial pressure was kept constant at a value of 0.4 MPa until an additional amount of 169 g of polymer (ii) was obtained. After degassing, 369 g of a composition containing polymers (i) and (ii) were collected from the autoclave. The catalyst had an activity $\alpha$ of 7.3. The following results were obtained:

Polymer (i)
$MI_2$=168

Polymer (ii)
$MI_5$=0.21

Composition Comprising the Polymers (i) and (ii)
$MI_5$=15.9
$\eta$=6700
$M_w/M_n$=21.

EXAMPLE 2

For Reference

In this example, a catalyst was manufactured having an intrinsic distribution defined by an $M_w/M_n$ ratio greater than 10, which was then used in a process for the polymerization of ethylene in two reactors.

A. Preparation of the Catalyst

Magnesium diethoxide, titanium tetrabutoxide and zirconium tetrabutoxide were reacted for 4 hours at 150° C. in amounts such that the Ti/Mg molar ratio is equal to 0.6 and such that the Zr/Ti molar ratio is equal to 1.2. The reaction product thus obtained was then chlorinated and precipitated by bringing the latter into contact with a solution of isobutylaluminium dichloride, first at 45° C. and then at 60° C. The solid thus obtained, collected from the suspension, comprised (% by weight):

Ti: 6
Zr: 12
Cl: 50
Al: 2

Mg: 5.

B. Polymerization of Ethylene in a Single Reactor

The operations of Example 1 (B) were repeated under the following operating conditions:

initial hydrogen partial pressure: 1.2 MPa ethylene partial pressure: 0.6 MPa amount of catalyst used: 12 mg duration of polymerization: 42 min amount of polyethylene produced: 60 g.

The polymer thus obtained had an $M_w/M_n$ ratio of 19 and the catalyst had a $K_d$ of 1.

C. Polymerization of Ethylene in Two Reactors

The operations of Example 1 (C) were repeated under the following operating conditions:

Polymerization of a First Polymer (i)

polymerization temperature: 85° C.

initial hydrogen partial pressure: 1.2 MPa ethylene partial pressure: 0.6 MPa amount of catalyst used: 12 mg amount of polyethylene produced: 54 g.

The catalyst had an activity α of 19.3.

Polymerization of Second Polymer (ii)

polymerization temperature: 70° C.

initial hydrogen partial pressure: 0.2 MPa ethylene partial pressure: 0.6 MPa butene/ethylene molar ratio: 0.28 amount of polyethylene produced in the second stage: 80 g total amount of polyethylene produced: 134 g.

The following results were obtained:

Polymer (i)

$MI_2=1.4$

Polymer (ii)

$MI_5=0.03$

Composition Comprising the Polymers (i) and (ii)

$MI_5=0.09$

η=23500

$M_w/M_n=18$.

A comparison of the results of Example 2 with those of Example 1 makes apparent the progress brought about by the invention as regards the difference between the melt indices of the polymers (i) and (ii) obtained in the two reactors.

What is claimed is:

1. A composition containing ethylene polymers comprising a polymer of high melt index and a polymer of low melt index prepared in at least two reactors, according to which ethylene, a catalyst derived from a transition metal selected from the group consisting of the elements of Group IIIB, IVB, VB and VIB of the periodic table and a cocatalyst are introduced into a first reactor; polymerization of the ethylene is carried out therein to produce a first ethylene polymer; a mixture comprising said first ethylene polymer, said introduced catalyst and said introduced cocatalyst is drawn off from said first reactor; wherein the mixture and ethylene are introduced into a second reactor, in which ethylene is polymerized to form a second ethylene polymer, the catalyst and cocatalyst being solely introduced into the first reactor, the weight ratio of the ethylene polymers being equal to (30 to 70):(70 to 30), and wherein the molecular weight distribution of a polymer produced in a single polymerization stage and under constant polymerization conditions in the presence of said catalyst is defined by a ratio $M_w/M_n$, between the weight-average molecular mass ($M_w$) of the polymer and the number average molecular mass ($M_n$) of the polymer, which is less than or equal to 10 and said catalyst further defined by a deactivation constant less than or equal to 0.5 h$^{-1}$, and wherein the polymer of high melt index has a melt index $MI_2$, measured under a load of 2.16 kg at 190° C., of 5 to 1000 g/10 min and the polymer of low melt index has a melt index $MI_5$, measured under a load of 5 kg at 190° C., of 0.01 to 2 g/10 min, the ratio between these melt indices being from 500 to 50,000, the composition having a molecular weight distribution defined by a $M_w/M_n$, ratio of from 5 to 70, the composition further having a melt index $MI_5$ of from 0.1 to 10 g/10 min and a dynamic viscosity η expressed in dPa.s and measured at a rate gradient of 100 s$^{-1}$ at 190° C., corresponding to the relationship $$0.652 \geq \frac{[\log(177470/MI_5) - \log\eta]}{2 - \log(2.53 \times MI_5)}.$$

2. The composition according to claim 1, wherein the catalyst is adapted to produce a polymer in a single polymerization stage and under constant polymerization conditions, said polymer defined by a $M_w/M_n$ ratio less than or equal to 7.

3. The composition according to claim 1, wherein the catalyst has a deactivation constant less than or equal to 0.2 h$^{-1}$.

4. The composition according to claim 1, wherein the catalyst has a transition metal contest of 10 to 30% by weight, and additionally comprises 0.5 to 20% by weight of magnesium, 20 to 60% by weight of at least one halogen and 0.1 to 10% by weight of aluminum.

5. The composition according to claim 4, wherein the transition metal is titanium and the halogen is chlorine.

6. The composition according to claim 1, wherein the cocatalyst is an organoaluminum compound.

7. The composition according to claim 1, wherein an alpha-olefin is additionally introduced into at least one of the reactors.

8. The composition according to claim 7, wherein the alpha-olefin is selected from the group consisting of 1-butene and 1-hexene.

9. The composition according to claim 1, wherein the polymerization is carried out in two reactors in a suspension polymerization.

10. The composition according to claim 1, wherein the polymer of high melt index is polymerized in a first reactor.

11. The composition according to claim 1, wherein the ethylene polymers comprise 0.5 to 10% by weight of alpha olefin relative to the sum of the weight of the first and second ethylene polymers.

12. The composition according to claim 1, wherein the polymer of high melt index is an ethylene homopolymer and the polymer of low melt index is an ethylene copolymer having an alpha-olefin content of 0.5 to 6% by weight.

13. A composition containing ethylene polymers comprising a polymer of high melt index and a polymer of low melt index prepared in at least two reactors, according to which ethylene, a catalyst derived from a transition metal selected from the group consisting of the elements of Groups IIIB, IVB, VB and VIB of the periodic table and a cocatalyst into a first reactor; polymerization of the ethylene is carried out therein to produce a first ethylene polymer, a mixture comprising said first ethylene polymer, said introduced catalyst and said introduced cocatalyst is drawn off from said first reactor; the mixture and ethylene are introduced into a second reactor, in which ethylene is polymerized to form a second ethylene polymer, the catalyst and the cocatalyst being solely introduced into the first reactor, the weight ratio of the ethylene polymers being equal to (40 to 60):(60 to 40), and wherein the molecular weight distribution of a polymer produced in a single polymerization stage and under constant polymerization conditions in the presence of said catalyst is defined by a ratio $M_w/M_n$, between the weight-average molecular mass ($M_w$) of the polymer and the number average molecular mass ($M_n$) of the polymer, which is less than or equal to 10 and said catalyst further defined by a deactivation constant less than or equal to $0.5\ h^{-1}$, and wherein the polymer of high melt index has a melt index $MI_2$, measured under a load of 2.16 kg at 190° C., of 5 to 1000 g/10 min and the polymer of low melt index has a melt index $MI_5$, measured under a load of 5 kg at 190° C., of 0.01 to 2 g/10 min, the ratio between these melt indices being from 500 to 50,000, the composition having a molecular weight distribution defined by a $M_w/M_n$ ratio of from 5 to 70, the composition further having a melt index $MI_5$ of from 0.1 to 10 g/10 min and a dynamic viscosity η expressed in dPa.s and measured at a rate gradient of $100\ s^{-1}$ at 190° C., corresponding to the relationship $$0.652 \geq \frac{[\log(177470/MI_5) - \log\eta]}{2 - \log(2.53 \times MI_5)}.$$

14. A composition containing ethylene polymers comprising a polymer of high melt index and a polymer of low melt index prepared in at least two reactors, according to which ethylene, a catalyst derived from a transition metal selected from the group consisting of the elements of Groups IIIB, IVB, VB and VIB of the periodic table and a cocatalyst are introduced into a first reactor, wherein polymerization of the ethylene is carried out therein to produce a first ethylene polymer; a mixture comprising said first ethylene polymer, said introduced catalyst and said introduced cocatalyst is drawn off from said first reactor; wherein, the mixture and ethylene are introduced into a second reactor, in which ethylene is polymerized to form a second ethylene polymer, the catalyst and the cocatalyst being solely introduced into the first reactor, the weight ratio of the ethylene polymers being equal to (30 to 70):(70 to 30), and wherein the molecular weight distribution of a polymer produced in a single polymerization stage and under constant polymerization conditions in the presence of said catalyst is defined by a ratio $M_w/M_n$, between the weight-average molecular mass ($M_w$) of the polymer and the number average molecular mass ($M_n$) of the polymer, which is less than or equal to 10 and said catalyst further defined by a deactivation constant less than or equal to $0.5\ h^{-1}$, and wherein the polymer of high melt index has a melt index $MI_2$, measured under a load of 2.16 kg at 190° C., of 5 to 1000 g/10 min and the polymer of low melt index has a melt index $MI_5$, measured under a load of 5 kg at 190° C., of 0.01 to 2 g/10 min, the ratio between these melt indices being from 1,000 to 10,000, the composition having a molecular weight distribution defined by a $M_w/M_n$ ratio of from 5 to 70, the composition further having a melt index $MI_5$ of from 0.1 to 10 g/10 min and a dynamic viscosity η expressed in dPa.s and measured at a rate gradient of $100\ s^{-1}$ at 190° C., corresponding to the relationship $$0.652 \geq \frac{[\log(177470/MI_5) - \log\eta]}{2 - \log(2.53 \times MI_5)}.$$

* * * * *

UNITED STATES PATENT AND TRADEMARK OFFICE
CERTIFICATE OF CORRECTION

PATENT NO.    : 6,136,924
DATED         : October 24, 2000
INVENTOR(S)   : Michel Promel Page 1 of 1

It is certified that error appears in the above-identified patent and that said Letters Patent is hereby corrected as shown below:

<u>Title page,</u>
Item [30], the Foreign Application Priority Data should read as
-- Dec. 21, 1992 [BEX] Belgium ..092 01 117 --.

Signed and Sealed this

Twelfth Day of February, 2002

*Attest:*

JAMES E. ROGAN
*Attesting Officer*    *Director of the United States Patent and Trademark Office*